May 9, 1933.  F. BLEY  1,908,107
INSERTABLE SAW TOOTH
Filed Nov. 30, 1931  2 Sheets-Sheet 1
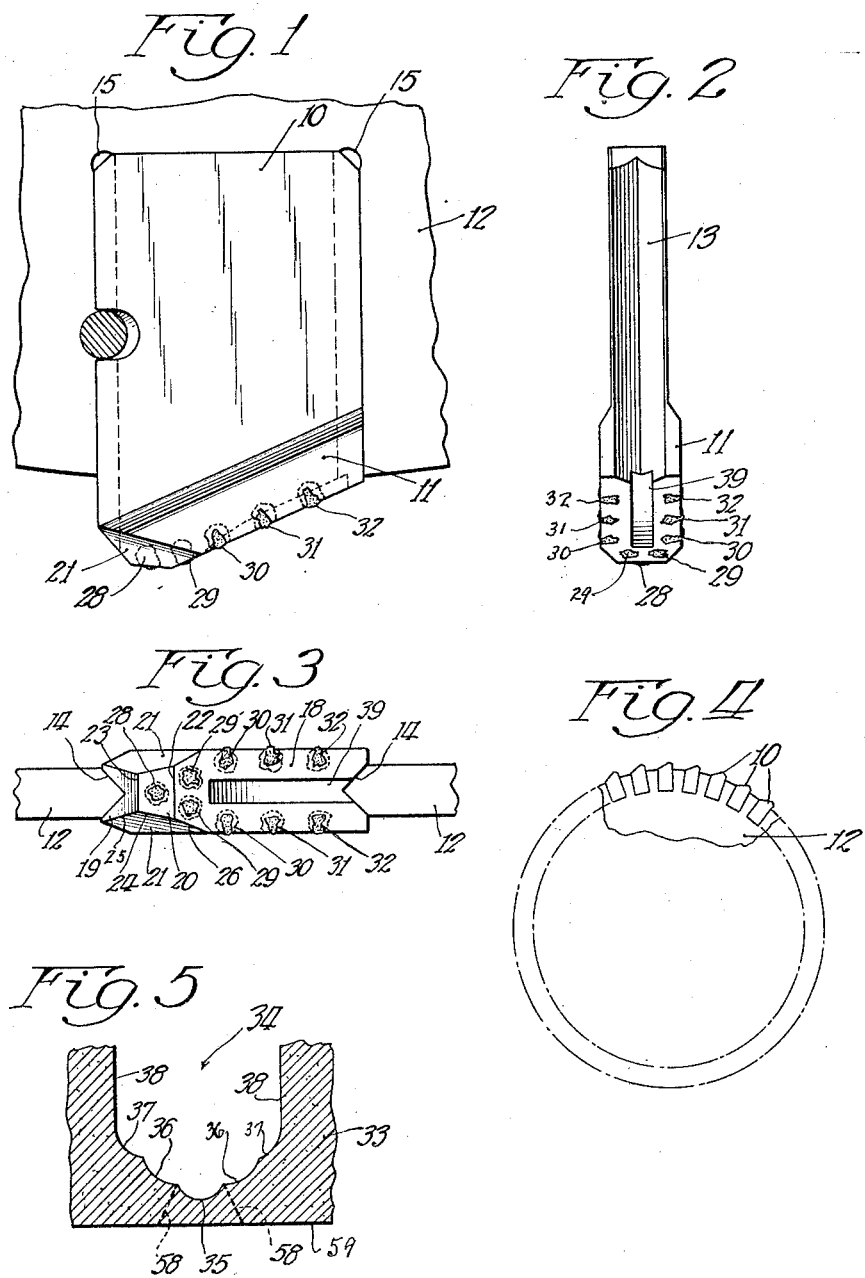
Witness:
V. Siljander
Inventor
Fred Bley,
By Hill, Hill
Attys.

May 9, 1933.  F. BLEY  1,908,107
INSERTABLE SAW TOOTH
Filed Nov. 30, 1931  2 Sheets-Sheet 2
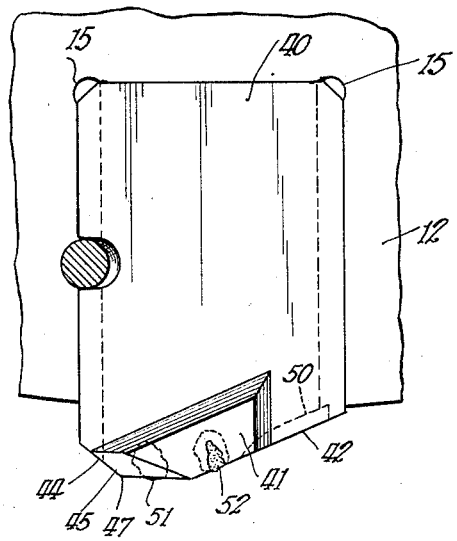
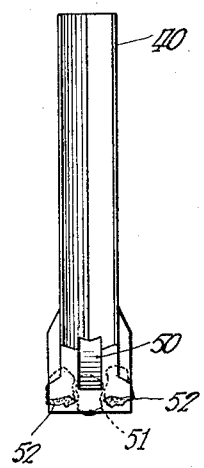
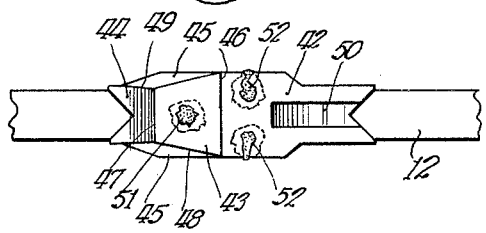
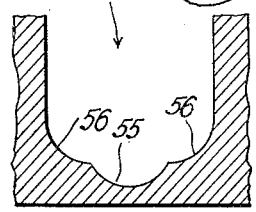
Inventor
Fred Bley Patented May 9, 1933

1,908,107

UNITED STATES PATENT OFFICE

FRED ELEY, OF CHICAGO, ILLINOIS, ASSIGNOR OF ONE-HALF TO MARTIN HOERER, OF CHICAGO, ILLINOIS

INSERTABLE SAW TOOTH

Application filed November 30, 1931. Serial No. 577,958.

The invention relates to insertable teeth for stone cutting saws and more particularly it relates to teeth wherein hard substances such as diamonds or the like are embedded to serve as cutting elements.

An object of the invention is the provision of an improved insertable tooth of the kind described adapted for sawing stone, marble, slate and similar material with a minimum of strain on the cutting elements and tooth.

Saw teeth of the kind described have heretofore been constructed with the cutting area perpendicular to the longitudinal axis of the tooth and the cutting elements arranged to form either an angular cut of the complete width of the tooth or of slightly less than the full width of the tooth with narrow shoulders on each side of the cut. The initial contact with the rock of a saw having teeth forming angular full width cuts, produces a shock setting up vibrations in the saw body which continue until the saw has travelled several inches into the rock and as a result of the vibration the initial cut is substantially wider than the remaining portion of the cut. This produces an undesirable variation in the cut surface of the stone and is the result of the saw being caused to suddenly start cutting a groove of substantial width. The invention contemplates the provision of a saw tooth having its cutting area at a substantial angle to the longitudinal or radial axis of the tooth with a plurality of cutting elements so arranged in the cutting area that initial contact of the saw with the work produces a relatively narrow cut by one or a relatively small number of the cutting elements and as the saw advances additional cutting elements come into contact with the work to widen the original cut. This gradual application of additional cutting elements to the work in the initial operation loads up the saw slowly and eliminates the objectionable vibrations caused by the sudden application of the full load and an object of the invention is the provision of a saw tooth of the kind described so constructed as to avoid such initial vibration of the saw body.

The inclination of the cutting area to the longitudinal axis of the tooth has the further advantage of limiting to a small area the contact of the tooth with the bottom of the groove. In teeth having their cutting surface perpendicular to their longitudinal axis, substantially the entire cutting area moves in contact with the bottom of the groove. The friction between the cutting area and the rock increases the power necessary to advance the tooth through the work and another object of the invention is the provision of a saw tooth so constructed as to minimize its frictional contact with the bounding walls of the cut and enables the saw to be operated at a given rate with less power or advanced more rapidly for a given expenditure of power than is the case with teeth having their cutting areas perpendicular to the longitudinal axis.

The described inclination of the cutting area also provides a clearance space permitting the rapid removal of the sludge and thereby minimizes abrasion of the matrix of the tooth and avoids frequent resetting of the cutting elements.

It is found in practice that the force necessary to advance a saw making a square cut of substantially full width creates a substantial pressure on the stone in advance of the saw. This pressure causes the stone to chip at angles of substantially forty-five degrees as the saw approaches the end of the work thereby leaving an undesirable and ragged edge of greater width than the cut. The slight pressure required to advance a saw equipped with teeth constructed in accordance with the principles of the invention minimizes such chipping of the stone in advance of the saw at the termination of the cut and another object of the invention is the provision of saw teeth so constructed that the terminus of the cut is bounded by a smooth straight surface.

It is well known to those familiar with the art that the resistance to the initial cutting produces a tendency of the saw to tip either to the right or to the left. This is especially noticeable in a saw that has been used for sometime and has lost its original tension. In backing up the saw it is released from the pressure causing such inclination and in idle position will have a tendency to straighten. The backing of the saw out of the cut will cause an undesirable scratching and marring on the sides of the cut known as back lashing. Still another object of the invention is the provision of a saw tooth having the cutting elements so arranged as to minimize the back lashing and operable to smooth the side surfaces of the cut both in advancing and in backing the saw out of the cut.

Among the further objects of the invention is the provision of a saw tooth that will advance rapidly through the work for a given application of force, that will smooth the cut surfaces, and will minimize the power necessary to operate the saw.

A further object of the invention is the provision of a saw tooth constructed to form a cut having its bottom portion taking the shape of a spear or wedge.

Still another object of the invention is the production of a saw tooth of the kind described which is easy to manufacture, durable, reliable, easily installed in operative position and highly satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is a side elevational view of a saw tooth embodying the principles of my invention and a fragmentary view of a circular saw body in which a plurality of such teeth are detachably mounted;

Fig. 2 is an end elevational view of the teeth shown in Fig. 1;

Fig. 3 is a view of the projecting end of the tooth shown in Fig. 1;

Fig. 4 is a diagrammatic view of a saw body showing the directions of rotation and travel of the saw;

Fig. 5 is a view of a fragment of rock showing the shape of the groove or cut made by the teeth as the saw is advanced through the work;

Fig. 6 is a side elevational view of still another tooth embodying the principles of my invention;

Fig. 7 is an edge elevational view of the tooth shown in Fig. 6;

Fig. 8 is an end view of the cutting portion of the tooth; and

Fig. 9 is a view of a fragment of stone showing the shape of the grooves or cuts made by the teeth illustrated in Fig. 6.

Referring now more particularly to the drawings, the numeral 10 generally designates a tooth embodying the principles of the invention, such tooth having a cutting end 11 with its outer surface inclined to the longitudinal radial axis of the tooth. A plurality of the teeth 10 are mounted in a disc shaped saw body 12 having a plurality of recesses 15 one for each tooth. The teeth 10 have V-shaped longitudinally extending grooves 13 in each edge which fit V-shaped sides 14 forming the bounding walls of the recesses 15. The teeth are fastened to the disc 12 by rivets in the usual manner and with the cutting end 11 inclined substantially to the adjacent edge of the saw body 12.

The teeth 10 are especially adapted for ordinary sawing of rock and their cutting area comprises a main portion 18 substantially inclined to their longitudinal axes and a front beveled surface 19 oppositely inclined to the surface 18. A groove 39 in the surface 18 of each tooth is provided to receive a chisel or the like enabling the tooth to be driven to a tight fit in its recess 15 without injuring the cutting elements. Intermediate the surfaces 18 and 19 is a surface 20 forming the extreme outer portion of the tooth. The cutting end of the tooth 10 is wider than the saw body 12 with the main body of the tooth of equal or less width than the saw body so that the cut or groove formed by the teeth is substantially wider than the saw body. The rear edge of the teeth 10 project from the disc 12 very slightly and the forward end projects further, the amount of such projection being determined by the inclination of their cutting surfaces. The front portion of the tooth is also bounded by a pair of oppositely positioned beveled surfaces 21. The main cutting surface 18 intersects the surface 20 along a line 22 and the front surface 19 also intersects the surface 20 along a line 23. The oppositely positioned beveled surfaces 21 intersect the surfaces 18, 19 and 20 along the lines 26, 25 and 24 respectively.

The extreme surface portion 20 has a diamond or cutting element 28 embedded therein on the median line of the tooth. Upon initial contact of the tooth with the work this element 28 cuts a groove similar to that shown in Fig. 5 and designated by the numeral 35. A pair of diamonds or cutting elements 29 are positioned just to the rear of the line 22 in the area 18 and intermediate the median line of the tooth and the side edges thereof. The diamonds 29 following initial contact of the tooth with the work cut out grooves or areas similar to those shown in Fig. 5 and designated by the numeral 36. As the initial cutting proceeds a pair of diamonds 30, mounted to the rear of the diamonds 29 and so embedded in the tooth as to project both from the area 18 and the sides of the tooth, come into contact with the work and cut out areas similar to those shown in Fig. 5 and designated by the numeral 37. It will be observed that the cut 34 as shown in Fig. 5 starts with a relatively small groove 35 which is gradually enlarged as the saw proceeds into the work until it takes the full width of the cut. Obviously the strain or force arising from initial contact of the single cutting element 28 minimizes or prevents the objectionable initial vibration of the saw otherwise resulting from suddenly plunging a saw into the work to produce a cut or groove of full width. As the saw is further advanced the grooves 35, 36 and 37 are deepened or increased and pairs of cutting elements 31 and 32, respectively, operate as smoothing elements to remove the rough surfaces bounding the side walls of the groove 34. The pairs of diamonds 31 and 32 also smooth or remove the rough surfaces 38 bounding the walls of the cut 34 and at the same time serve as steadying guides for the saw body. They also remove any deep circular scratches resulting from back lashing in backing the saw out of the cut.

The thrust of the saw as it approaches the end of the rock, indicated in Fig. 5 by the line 59, tends to chip the end of the rock by breaking it along the dotted lines 58. The lines 58 extend at an angle of approximately forty-five degrees from the sides of the initial groove 35 and the chipped surfaces are all removed by the final cutting operation of the diamonds 29 and 30 so as to leave a smooth surface. The tendency to chip along the end of the rock during the final cutting operation is less than in saws as heretofore constructed having teeth forming an angular cut since the pressure necessarily exerted by such saws is greater than in the pointed cut of the invention. It is found in practice that the chipping caused by such saw pressure occurs along lines diverging from the direction of cut at angles of substantially forty-five degrees and that these lines of chipping start at the sides of the cut leaving rough chipped portions lying entirely outside of the completed cut. This tendency of the teeth to minimize the chipping combined with a construction causing such chipping to occur within a zone bounded by the side walls of the finished cut is a distinct advantage and an important feature of the invention.

An alternative embodiment of the invention is shown in Figs. 6, 7 and 8 as embodied in a tooth 40 especially adapted for rough cutting or ripping rock. The teeth 40 are mounted in recesses 15 of the disc 12 in the same manner as described for the teeth 10. Each tooth 40 has a cutting end 41 of greater width at the front than the main body of the tooth. The cutting end of the teeth each terminates in a relatively small surface 43 positioned between surfaces 42 and 44. The surface 42 is inclined outwardly from the saw body towards the front end of the tooth and intersects the surface 43 on a line 46. The surface 44 is inclined oppositely to the surface 42 and intersects the surface 43 along a line 47. The rear portion of the projecting end of the tooth 40 is narrower than the front portion and thereby permits the sludge to freely escape from the cut 54. A pair of opposite longitudinally extending beveled surfaces 45 intersect the surfaces 43 and 44 along lines 48 and 49 respectively. A chisel groove 50 is provided in the surface 42 to enable the tooth 40 to be driven to a tight fit in its mounting without injury to the cutting elements embedded in the tooth.

A diamond or cutting element 51, projecting from the surface 43 on the longitudinal median line of the tooth, initially contacts with the rock and rips out a groove 55 coincident with the center line of the cut. A pair of diamonds or cutting elements 52 are mounted rearwardly of the element 51 to project from the inclined surface 42 so as to contact with and rip out the rock and form grooves 56 on either side of the initial groove 55 and thereby widens the cut. The elements 52 also project from the sides of the enlarged cutting end 41 and tend to smooth the surface or side walls of the cut generally designated by the numeral 54.

The initial contact of the single cutting elements 51 with the rock avoids the objectionable vibration incidental to a sudden application of the teeth to make a cut of full width in the rock. The diminished pressure on the stone in advance of the work also minimizes the tendency of the stone to break at forty-five degrees to the cut as the saw approaches the final stage of the work, and such breaking as does occur starts with the narrow groove cut out in advance by the element 51 and is substantially all removed by the elements 52 as they emerge from the forward end of the stone in the same manner as described for the teeth 10.

Thus it will be seen that I have provided novel saw teeth of the kind described which have their cutting areas inclined to the direction of travel and to the longitudinal axes of the teeth thereby minimizing the power required for a given rate of travel or amount of cut by eliminating frictional contact of the cutting areas of the saw teeth with the bottom of the cut. The sludge is also freely released from the cut and a further advantage is the elimination of the objectionable features of back lashing leaving a smooth surface on the side walls bounding the cut.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A saw tooth of the kind described adapted for mounting on and projecting from the cutting edge of a saw body, said tooth having its projecting end inclined rearwardly towards the saw body, a cutting element mounted on the forward end of the tooth with its projecting portion substantially bisected by the longitudinal median plane of the tooth, and a pair of cutting elements positioned rearwardly of said forward element in opposite equally spaced relation to said median plane, the cutting portions of the elements comprising said pair being closer to the edge of the saw body than said first mentioned element.

2. A saw tooth of the kind described adapted for mounting on and projecting from the cutting edge of a saw body, said tooth having its projecting end inclined rearwardly towards the saw body, a cutting element mounted on the forward end of the tooth with its projecting portion substantially bisected by the longitudinal median plane of the tooth, a plurality of cutting elements arranged in pairs rearwardly of said forward cutting element, the elements comprising a pair being oppositely positioned and equally spaced relative to said median plane, said pairs of elements being arranged in spaced apart relation longitudinally of the tooth and so positioned in the tooth that the distance of the exposed cutting portion of each element from the adjacent edge of the saw body is less than for the corresponding distance of the element positioned immediately in front thereof.

3. A saw tooth of the kind described adapted for mounting on and projecting from the cutting edge of a saw body, said tooth having its projecting end inclined rearwardly towards the saw body, a cutting element mounted on the forward end of the tooth with its projecting portion substantially bisected by the longitudinal median plane of the tooth, a plurality of cutting elements arranged in pairs rearwardly of said forward cutting element, the elements comprising a pair being oppositely positioned and equally spaced relative to said median plane, said pairs of elements being arranged in spaced apart relation longitudinally of the tooth and so positioned that the distance of the exposed cutting portion of each element from the adjacent edge of the saw body is less than the corresponding distance of the element positioned immediately in front thereof, the transverse spacing between the elements of successive pairs increasing rearwardly.

4. In a saw of the kind described, the combination with a saw body adapted to be actuated to effect a cutting movement and having a plurality of recesses in its cutting edge, of a plurality of teeth, one for each recess, adapted to be inserted and secured therein with one end projecting beyond the cutting edge of the body, said projecting end of each tooth providing a cutting surface inclined rearwardly to the saw body, each tooth having a cutting element mounted in its forward end with its projecting portion substantially bisected by the longitudinal median plane of the tooth, each of said teeth having a plurality of cutting elements arranged in pairs rearwardly of said forward cutting element, the elements comprising a pair being oppositely positioned and equally spaced relative to said median plane, said pairs of elements being arranged in spaced apart relation longitudinally of the tooth, and so positioned in the tooth that their exposed cutting portions are closer to the adjacent edge of the saw body than said forward element.

5. In a saw of the kind described, the combination with a saw body adapted to be actuated to effect a cutting movement and having a plurality of recesses in its cutting edge, of a plurality of teeth, one for each recess, adapted to be inserted and secured therein with one end projecting beyond the cutting edge of the body, said projecting end of each tooth providing a cutting surface inclined rearwardly to the saw body, each tooth having a cutting element mounted in its forward end and with its projecting portions substantially bisected by the longitudinal median plane of the tooth, each of said teeth having a plurality of cutting elements arranged in pairs rearwardly of said forward cutting element, the elements comprising a pair being oppositely positioned and equally spaced relative to said median plane, said pairs of elements being arranged in spaced apart relation longitudinally of the tooth, and so positioned in the tooth that the distance of the exposed cutting portions of each element from the adjacent edge of the saw body is less than the corresponding distance for the element immediately in front thereof, the transverse spacing between the elements comprising the pairs increasing rearwardly.

In witness whereof, I hereunto subscribe my name this 28th day of November, A. D. 1931.

FRED BLEY.